(12) United States Patent
Venkatesh et al.

(10) Patent No.: US 11,594,891 B2
(45) Date of Patent: Feb. 28, 2023

(54) ELECTRICAL POWER SYSTEMS

(71) Applicant: Rolls-Royce plc, London (GB)

(72) Inventors: Pabbathi Venkatesh, Derby (GB); Xiong Liu, Derby (GB); Stephen J. Mountain, Derby (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 17/532,436

(22) Filed: Nov. 22, 2021

(65) Prior Publication Data

US 2022/0190606 A1    Jun. 16, 2022

(30) Foreign Application Priority Data

Dec. 14, 2020   (GB) .................................. 2019655

(51) Int. Cl.
 *H02J 3/46*   (2006.01)
 *H02J 3/38*   (2006.01)
 (Continued)

(52) U.S. Cl.
 CPC ............... *H02J 3/46* (2013.01); *H02J 3/381* (2013.01); *B60K 6/26* (2013.01); *B60R 16/0231* (2013.01);
 (Continued)

(58) Field of Classification Search
 CPC ...... H02J 3/46; H02J 3/381; H02J 3/38; H02J 2300/10; B60K 6/26; B60W 20/00;
 (Continued)

(56) References Cited

U.S. PATENT DOCUMENTS

2014/0008988 A1   1/2014  Clarke et al.
2014/0097683 A1   4/2014  Piyabongkarn et al.
(Continued)

FOREIGN PATENT DOCUMENTS

EP   0730333 A2   9/1996
EP   2765692 B1   6/2020
(Continued)

OTHER PUBLICATIONS

European Extended Search Report, dated May 6, 2022 and issued in connection with EP Appln. No. 21208370.3.
(Continued)

*Primary Examiner* — Robert L Deberadinis
(74) *Attorney, Agent, or Firm* — Barnes & Thornburg LLP

(57) ABSTRACT

Electrical power systems and methods of controlling electrical power systems are described. One such electrical power system comprises: a first ac bus and a first generator set configured to supply the first ac bus with ac electrical power; a second ac bus and a second generator set, configured to supply the second ac bus with ac electrical power; an interconnecting transformer connected between the first and second ac busses; a primary electrical load connected to both the first and second ac busses via a converter arrangement; an auxiliary load connected to the first ac bus; and a controller configured to control the first generator set according to a first droop control profile and to control the second generator set according to a second droop control profile, the first and second droop control profiles relating respective generator operating frequencies of the first and second generator sets to respective output powers of the first and second generator sets.

20 Claims, 4 Drawing Sheets

(51) Int. Cl.
   *B60R 16/023* (2006.01)
   *B60K 6/26* (2007.10)
   *B60W 20/00* (2016.01)

(52) U.S. Cl.
   CPC .......... *B60W 20/00* (2013.01); *B60Y 2200/30* (2013.01); *B60Y 2200/50* (2013.01); *B60Y 2200/80* (2013.01); *B60Y 2200/92* (2013.01); *H02J 2300/10* (2020.01)

(58) Field of Classification Search
   CPC ............ B60Y 2200/30; B60Y 2200/50; B60Y 2200/80; B60Y 2200/92
   See application file for complete search history.

(56) References Cited

U.S. PATENT DOCUMENTS

| | | |
|---|---|---|
| 2014/0139168 A1 | 5/2014 | Trainer et al. |
| 2014/0265354 A1 | 9/2014 | Folken et al. |
| 2018/0366950 A1 | 12/2018 | Pederson et al. |

FOREIGN PATENT DOCUMENTS

| | | |
|---|---|---|
| EP | 3742596 A1 | 11/2020 |
| GB | 2445382 A | 7/2008 |

OTHER PUBLICATIONS

Intellectual Property Office Search Report, Application No. GB2019655.6, dated May 25, 2021, 1 page.

ELECTRICAL POWER SYSTEMS

CROSS-REFERENCE TO RELATED APPLICATIONS

This specification is based upon and claims the benefit of priority from United Kingdom Patent Application No. 2019655.6, filed on 14 Dec. 2020, the entire contents of which are incorporated herein by reference.

TECHNICAL FIELD

This disclosure concerns electrical power systems having alternating current (ac) busses and methods of controlling such electrical power systems. The electrical power systems may be particularly suitable for use in vehicle propulsion systems, for example propulsion systems of aircraft, marine vessels or trains.

BACKGROUND

As the need to reduce carbon emissions grows and electrical technologies develop, interest in hybrid electric platforms and so-called 'more electric' platforms is increasing. Hybrid platforms use both internal combustion engines, for example reciprocating engines or gas turbine engines, and electrical machines to provide propulsive power. More electric platforms primarily or exclusively use internal combustion engines for propulsive power, but make increased use of electrical power to power systems which previously, typically, have not been electrically powered. More electric platforms may also use electrical machines to facilitate engine starting or the transfer of mechanical power between engine shafts in gas turbines, for example.

Hybrid and more electric systems typically include one or more generator sets (commonly known as gen-sets) connected to one or more electrical busses. Each generator set includes a prime mover, for example a diesel engine or a gas turbine engine, with a rotary shaft connected to an electrical machine that outputs electrical power to one or more of the busses. Propulsive and/or non-propulsive electrical loads are connected to and draw electrical power from the one or more busses.

A variety of bus architectures are possible and have been proposed. This includes DC bus architectures and ac bus architectures. Each of these architectures is associated with its own set of advantages and disadvantages.

European Patent publication EP 2765692 B1 describes an electrical system with a two-lane ac architecture. Each lane has a generator and a load connected by a bus, and a rectifier between the generator and the load. A known phenomenon in rectified electrical systems is the introduction of parasitic harmonic currents, particularly the 5th and 7th order harmonics. One way of reducing the parasitic harmonics, detailed in EP 2765692 B1, is to connect a harmonic mitigating transformer between the two ac busses to draw the 5th and 7th order harmonics and reduce the effect on the wider electrical system.

The two ac lanes described in EP 2765692 B1 are essentially independent: each bus is supplied by its own generator and supplies its own load, with no sharing of the loads between the generators. In some applications, however, it may be desirable to share loads between generators in a multi-bus architecture.

SUMMARY

The invention is directed towards an electrical power system having a plurality of generator sets and a plurality of ac busses, and to a method of controlling such an electrical power system. The power demands of at least some of the electrical loads connected to the ac busses are shared between parallel-connected generator sets, with equal power sharing implemented using differing droop control profiles.

According to a first aspect there is provided an electrical power system comprising: a first ac bus and a first generator set configured to supply the first ac bus with ac electrical power; a second ac bus and a second generator set configured to supply the second ac bus with ac electrical power; an interconnecting transformer connected between the first and second ac busses; a primary electrical load connected to both the first and second ac busses via a converter arrangement, such that the primary electrical load can receive electrical power from both the first and second generator sets; an auxiliary electrical load connected the first ac bus, such that the auxiliary electrical load receives electrical power from the first generator set; and a controller configured to control the first generator set according to a first droop control profile and to control the second generator set according to a second droop control profile. The first and second droop control profiles relate respective output frequencies of the first and second generator sets to respective output powers of the first and second generator sets. The controller is configured to control the first and second generator sets such that their output frequencies are equal. The first and second droop control profiles differ such that, when the first and second generator sets operate at equal output frequencies, an electrical power demand of the auxiliary load is met by the first generator set and an electrical power demand of the primary electrical load is shared equally between the first and second generator sets.

According to a second aspect, there is provided a method of controlling an electrical power system having first and second ac busses connected by an interconnecting transformer; respective first and second generator sets connected to the respective first and second ac busses; a primary electrical load connected to both the first and second ac busses via a converter arrangement; and an auxiliary electrical load connected to the first ac bus. The method comprises: controlling the first generator set according to a first droop control profile, the first droop control profile relating an output frequency of the first generator set to an output power of the first generator set; and controlling the second generator set according to a second droop control profile different from the first droop speed control profile, the second droop control profile relating an output frequency of the second generator set to an output power of the second generator set. The first and second generator sets are controlled such that their output frequencies are equal. The first and second droop control profiles differ such that, when the first and second generator sets operate at equal output frequencies, an electrical power demand of the auxiliary load is met by the first generator set and an electrical power demand of the primary electrical load is shared equally between the first and second generator sets.

A propulsion system comprising the electrical power system of the first aspect is also provided. The propulsion system may be a propulsion system of an aircraft, a marine vessel such as a boat or a ship, or a train.

A controller according to the first aspect or configured to perform the method of the second aspect is also provided.

A computer program comprising code and a computer readable medium having code stored thereon are also provided. The code, when executed by one or more controllers, causes the one or more controllers to perform the method of the second aspect. The computer readable medium may be a non-transitory computer readable medium of any suitable type known in the art.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

FIG. 1

Figure 1:
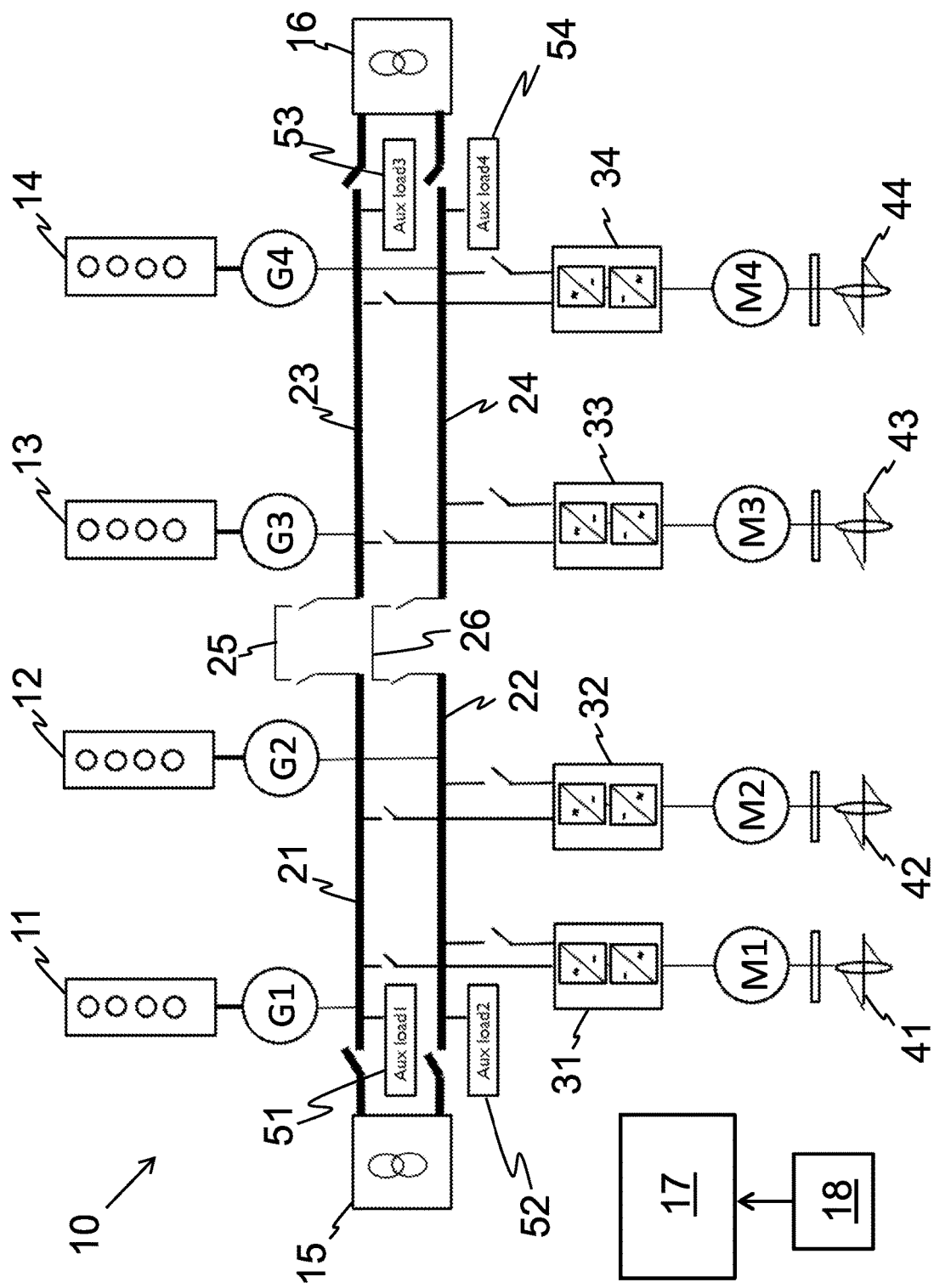
FIG. 1 is a schematic illustration of an electrical power system in accordance with the present disclosure.

FIG. 1 illustrates a distributed propulsion system 10 such as may be used in a hybrid electric vehicle, for example a hybrid electric aircraft, marine vessel or train.

The exemplary propulsion system 10 includes four prime movers 11, 12, 13, 14, which may be reciprocating engines (diesel engines, for example), gas turbine engines (of the turbofan kind, the turboprop kind or another kind) or the like. Each engine 11-14 has an output drive shaft that is drivably coupled to a rotor of one of the four illustrated electrical machines G1, G2, G3, G4 configured as electrical generators, hereafter referred to as generators G1-G4. In this specific example, each generator G1-G4 is a three-phase permanent magnet synchronous generator. Thus, the rotation of the rotor of each generator G1-G4, driven by the drive shaft of the corresponding engine 11-14, generates three-phase alternating current in a corresponding stator of the generator G1-G4.

The engines 11-14 and generators G1-G4 together form generator sets. That is, the system 10 includes a first generator set comprising the first engine 11 and the first generator G1; a second generator set comprising the second engine 12 and the second generator G2; a third generator set comprising the third engine 13 and the third generator G3; and a fourth generator set comprising the fourth engine 14 and the fourth generator G4.

The alternating current generated in the stator of the generator G1-G4 is output to one of the four illustrated ac busses 21, 22, 23, 24. That is, the first generator set 11, G1 supplies alternating current to the first ac bus 21; the second generator set 12, G2 supplies alternating current to the second ac bus 22; the third generator set 13, G3 supplies alternating current to third ac bus 23; and the fourth generator set 14, G4 supplies alternating current to the fourth ac bus 24.

In this specific example, the first and third busses 21, 23 are connectable by a bus tie 25. Likewise, the second and fourth busses 22, 24 are connectable by a bus tie 26. In this way, the system 10 can be configured as a four-bus system in which both bus ties 25, 26 are open and each bus 21-24 is supplied by one generator set, or a two-bus system in which both bus ties 25, 26 are closed and each bus is supplied by two generator sets. The system could also be configured as a three-bus system by closing just one of the two bus ties 25, 26, in which case one bus will be supplied by two generators and the other two busses will each be supplied by one generator.

The exemplary propulsion system 10 also includes four propulsors 41, 42, 43, 44 for providing propulsive thrust. The propulsors 41-44 may be ducted fans, marine propulsors or another suitable arrangement for providing propulsion. Each propulsor has a drive shaft which is driven by a rotor of one of the four illustrated electrical machines M1, M2, M3, M4 configured as motors. In this specific example, each motor M1-M4 is a three-phase permanent magnet synchronous motor. Thus, a corresponding stator of each motor M1-M4 receives three-phase alternating current which excites a stator magnetic field. The stator magnetic field interacts with a rotor magnetic field generated by permanent magnets of the rotor, which drives the rotation of the rotor of the motor M1-M4.

The motors M1-M4 receive the three-phase current from the illustrated converter arrangements 31, 32, 33, 34. In this specific example, each of the converter arrangements 31-34 is an AC-AC converter formed from an AC-DC converter (a rectifier) and a DC-AC converter (an inverter) connected back-to-back in series. The rectifiers of the converters 31-34 draw alternating current from the ac busses 21-24, rectify the alternating current to direct current and output the direct current to the associated inverters. The inverters of the converters 31-34 receive the direct current from the rectifiers, invert the direct current to alternating current and output the alternating current to the motors M1-M4. The AC-AC conversion is used to regulate the ac power output to the motors M1-M4, for example by modifying the voltage, current and/or frequency of the input before outputting alternating current to the motors.

Importantly, in the exemplary system 10, each of the converter arrangements 31-34 is connectable to more than one of the ac busses 21-24. Specifically, the first converter arrangement 31 is connectable to both the first and second ac busses 21, 22; the second converter arrangement 32 is connectable to both the first and second ac busses 21, 22; the third converter arrangement 33 is connectable to both the third and fourth ac busses 23, 24; and the fourth converter arrangement 34 is connectable to both the third and fourth ac busses 23, 24. In this way, the power demand of each propulsive load M1-M4 can be shared between multiple generators G1-G4. In other words, with respect to the propulsive loads M1-M4, the generators G1-G4 are or at least can be connected in parallel. For example, the generators G1-G2 can be connected in parallel to the first propulsive load M1.

There are number of reasons why it may be desirable to share a propulsive load between multiple busses and generator sets. One reason is redundancy. By connecting a propulsive load M1 to multiple busses 21, 22 and multiple generator sets 11, G1; 12, G2, a fault in one generator set or its associated bus will not result in a complete loss of power to the propulsive load M1. By appropriately over-rating each generator set, each propulsive load can receive full power even if a generator fails or there is a fault in an associated bus.

Also shown in FIG. 1 are auxiliary electrical loads 51, 52, 53, 54. The auxiliary electrical loads 51-54 can be any non-propulsive electrical loads that are to be powered by the electrical power system. Examples include lighting, heating, cabin ventilation and environmental systems, electrical actuators, cabin entertainment systems and others. As can be seen in FIG. 1, each of the auxiliary loads 51-54 is connected to only one bus. For example, the first auxiliary load 51 is connected to only the first bus 21, and the second auxiliary load 52 is connected to only the second bus 22. Thus, each generator set powers its own auxiliary load, and there is no sharing of the auxiliary loads between the generator sets. It will be understood that each auxiliary load, for example the first auxiliary load 51, may be a group of loads, for example a lighting load and a heating load, but there would be no sharing of this group of loads between multiple generators.

Whilst in principle the non-propulsive loads 51-54 could be treated in the same way as the propulsive loads M1-M4, by connecting the non-propulsive 51-54 loads to multiple busses in order to allow power sharing, this may not be desirable. For example, connecting a load to multiple busses requires additional cabling and in some cases additional converter circuitry. This adds weight and complexity to the system. Whilst this may be acceptable for critical loads such as propulsive loads to provide redundancy, it is generally undesirable for non-critical loads. Therefore, the illustrated arrangement with auxiliary loads that are not shared between generators may be preferred.

As noted previously, a known problem in rectified electrical systems is the introduction of parasitic harmonic currents, particularly the 5th and 7th order harmonics. The presence of these harmonics creates harmonic distortion in the windings of the generators G1-G4 and this reduces their efficiency and creates electromagnetic torque ripple. Thus, to reduce the impact of the harmonic currents, a first shunt-connected harmonic mitigating transformer 15 is connected between the first and second busses 21, 22. Likewise, a second transformer 16 is connected between the third and fourth busses 23, 24. It can be seen that the transformers 15, 16 are selectively connectable to the busses 21-24 via switches. In this way, if the bus ties 25, 26 are closed to create a two-bus system, one of the two transformers 15, 16 may be disconnected.

Any suitable transformer arrangement may be used and the specific details will depend to some extent on the specific implementation. In one particular example, the two connected busses are phase-shifted from each other by 30 degrees. The transformer may be a polygonal transformer. Where a polygon transformer is used, circulation current paths may exist and so the rectifier dc-links may be provided with common-mode filtering to suppress the circulation currents as, for example, described in European Patent Application publication EP3742596 A1. The interconnecting transformers 15, 16 may, for example, be of the types described in European Patent publication EP2765692 B1.

The system 10 also includes a controller 17 for controlling the operating parameters of the generators G1-G4, the motors M1-M4 and the converter arrangements 31-34 in accordance with the system requirements. In the present embodiment, the controller 17 is an engine electronic controller (EEC) that also controls operating parameters of the engines 11-14 of the generator sets. For example, the controller 17 may be a full-authority digital engine controller (FADEC), the configuration of which will be known and understood by those skilled in the art. A FADEC may control all aspects of the propulsion system 10 (i.e. the engines, electric machines and power electronics) and in this way may holistically respond to both thrust demand and electrical power demand.

The controller 17 receives information about the present operating parameters of the system via a sensor arrangement 18. The sensor arrangement 18 may, for example, provide indications of present power demands of the auxiliary electrical loads 51-54 so that changes to the operation of the generator sets can be made to meet the changing power demands. The sensor arrangement 18 may also provide indications of the present thrust demand of the system, from which the controller 17 can determine appropriate operating parameters (operating speeds, for example) for the motors M1-M4 and also control the generator sets 11-14, G1-G4 and converter arrangements 31-34 accordingly.

FIGS. 2A-2B

Whilst the mitigating transformers 15, 16 are capable of drawing the parasitic harmonic currents and thus reducing their effect on the wider electrical system, the impact of sharing the propulsive loads M1-M4 between multiple busses 21-24 supplied by independent generators G1-G4 requires further consideration. In the following description, for the sake of clear explanation, the operation of two generator sets 11, G1; 12, G2 sharing a single propulsive load M1 will be considered. The skilled person will, however, appreciate that the following description can be applied more generally, for example to the system 10 which includes four generator sets, four busses 21-24 and four propulsive loads M1-M4.

Generally speaking, with a propulsive load M1 connected in parallel with two generators G1, G2 via two ac busses 21, 22, stable operation requires that the two generators G1-G2 output current at the same frequency, $\omega$. Further, it has been found to be desirable that the propulsive load power is shared equally between the two generators G1-G2. If the propulsive load M1 does not draw equal powers from the two busses 21, 22, current of the fundamental frequency will tend to flow through the mitigating transformer 15. This is undesirable because the amplitude of the current of the fundamental frequency is much larger than the amplitudes of the currents of the harmonic frequencies. The transformer 15 would thus require a much higher current rating. A higher rated transformer will be bulkier, which adds weight to the system.

In the absence of any auxiliary loads, equal power sharing between the two generators G1-G2 can conveniently be implemented using identical generator sets which output the same amount of power when operated in the same way using the same operating parameters. If, however, the auxiliary loads 51-52 are introduced to the system 10, unless the two auxiliary loads 51, 52 are identical, equal power sharing will not occur and fundamental frequency current will flow through the transformer.

To illustrate, a simulation was performed for a ship propulsion system having a propulsive load connected in parallel with two identical 2048 kVA diesel generator sets via two ac busses interconnected by a harmonic mitigating transformer. In the simulation, the propulsive load was fixed but first and second auxiliary loads connected to the first and second busses were varied. Specifically, between 0 and 8 seconds, each of the two busses is connected to an identical auxiliary load of 0.1 MW. After 8 seconds, the auxiliary load of one of the two busses is increased to 1.0 MW. This is summarised in Table 1.

TABLE 1

| | Auxiliary Loads (MW) | |
|---|---|---|
| | Before 8 seconds | After 8 seconds |
| Bus-1 | 0.1 | 0.1 |
| Bus-2 | 0.1 | 1.0 |

Figure 2A:
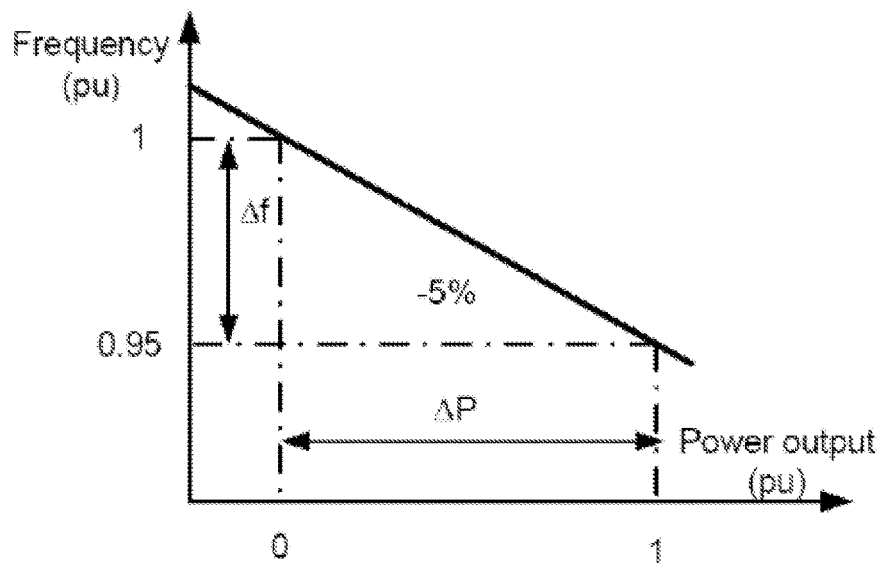
FIG. 2A is a graph illustrating a droop control line for a generator set.

Between zero and eight seconds, the two generators have a common frequency $\omega_i$ and each outputs half the total power demand. When the total system load power demand increases after eight seconds, a system controller (controller 17 in FIG. 1, for example) must change the operating parameters of the two diesel generator sets to meet the increased power demand. To do so, the controller uses a standard droop control scheme, which is illustrated in FIG. 2A and will be familiar to those skilled in the art. Using droop control (sometimes known as droop speed control or droop frequency control), an increase in generator power output of ΔP is associated with a reduction in the operating frequency of the generator by Δω (Δf in FIG. 2A). The relationship is a linear one, with the gradient of the line depending on the specifications of the generator set.

Figure 2B:
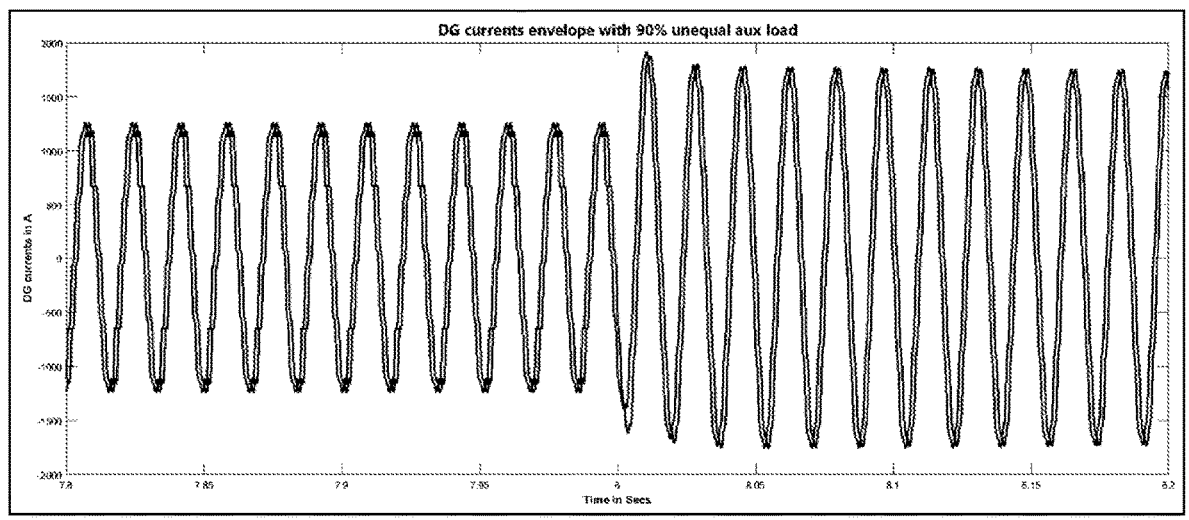
FIG. 2B shows the currents flowing in a pair of parallel-connected generators before and after an increase in an auxiliary load connected to one of the two generators, using conventional droop control.

In the simulation, the two diesel generator sets are identical and so the droop control lines will be identical. Further, since they are connected to the load in parallel, the generator frequencies are constrained to remain equal. Consequently, to meet the increase in system power demand, both diesel generator sets increase their power output by half the required increase in system load and reduce their generator frequencies by an equal amount dictated by the droop control line, giving a new common frequency $\omega_f$. This is illustrated in FIG. 2B, which shows the currents flowing through the windings of the two generators before and after eight seconds. As can be seen, there is an increase in the generator currents after eight seconds in view of the increased system load power, but the current flowing through the first generator is the same as the current flowing through the second generator throughout the simulation.

With the power outputs of the two generators remaining equal, yet the second auxiliary load increasing after eight seconds, it will be understood that the propulsive load cannot be shared equally between the two diesel generators because the second generator must independently power the second auxiliary load. Thus, after eight seconds, current of the fundamental frequency will flow through the mitigating transformer. This is shown in Table 2.

TABLE 2

| DG-1 Power (MW) | | DG-2 Power (MW) | | Transformer Current rms (A) | |
|---|---|---|---|---|---|
| Before 8 secs | After 8 secs | Before 8 secs | After 8 secs | Before 8 secs | After 8 secs |
| 0.5059 | 0.718 | 0.5058 | 0.718 | 82.99 | 521.9 |

It can be seen from Table 2 that, in the simulation, the increase in the second auxiliary load power and the resulting unequal sharing of the propulsive load between the two generator sets causes the rms transformer current to increase by a factor of between six and seven. It can thus be appreciated that a significantly larger transformer would be required to accommodate variability in the auxiliary load powers.

FIG. 3A-3B

Embodiments of the present disclosure may reduce the amount of fundamental frequency current that flows through the mitigating transformer by implementing a different form of droop control. Specifically, even though the generator sets may be identical and constrained to operate at the same generator frequency, different droop control profiles can be utilised to ensure equal sharing of a propulsive load despite different auxiliary loading. Furthermore, the droop control profiles can be modified based on feedback to ensure that equal sharing continues if the auxiliary load power demands change.

Figure 3A:
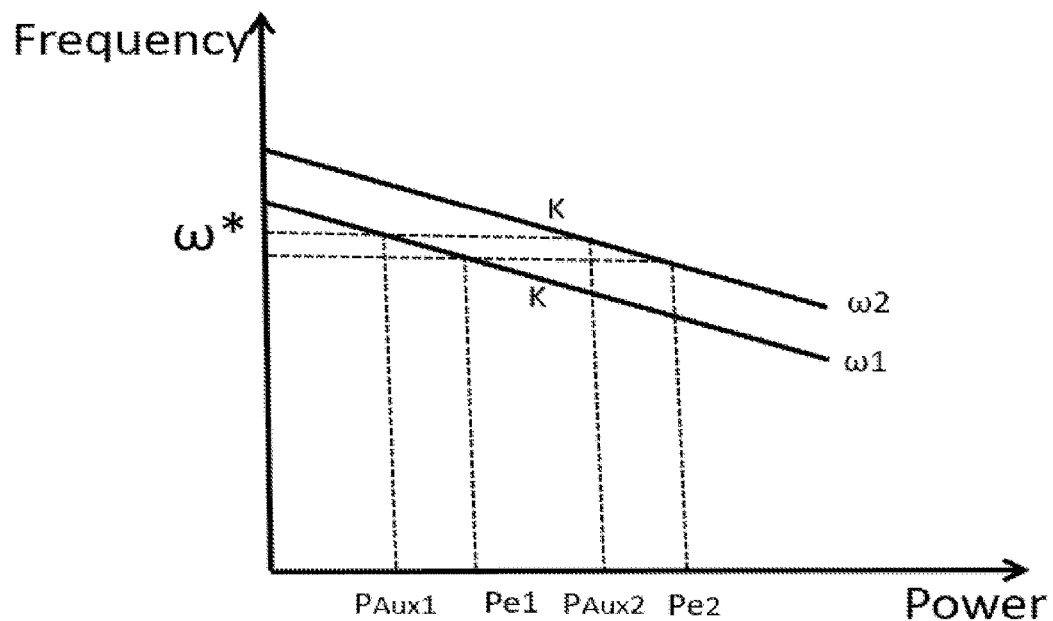
FIG. 3A is a graph illustrating two different droop control lines for controlling two identical generator sets in accordance with the present disclosure.

FIG. 3A illustrates two droop control profiles $\omega_1$, $\omega_2$ for use in controlling two identical generator sets (e.g. 11, G1; 12, G2 in FIG. 1) that supply two separate ac busses (e.g. 21, 22 in FIG. 1). Each droop control profile relates the generator frequency of the generator set to the required output load power. In other words, generator frequency is a function of generator set power output.

The two generator sets are identical, so the gradients of the two droop control lines are equal, indicated by the value K in FIG. 3A. However, in accordance with the present disclosure, the two droop control lines $\omega_1$ and $\omega_2$ have different zero-power frequencies. In other words, the two droop control lines intersect the frequency axis at different frequency values. In this way, it becomes possible to implement control of multiple identical generator sets such that they output different powers whilst operating at the same frequency. This difference in power output at equal frequency can be used to accommodate a difference in the auxiliary load powers such that, even with different auxiliary loads 51, 52, equal sharing of the propulsive loads M1, M2 can be achieved.

The appropriate difference between the zero-power frequencies of the two droop control profiles will be a function of the difference between the power demands $P_{Aux1}$, $P_{Aux2}$ of the auxiliary loads 51, 52. Specifically, for identical generator sets, it will be understood that:

$$\omega_1 = \omega_1^* - KP_1 \tag{1}$$

$$\omega_2 = \omega_2^* - KP_2 \tag{2}$$

Where $\omega^*_1$ and $\omega^*_2$ are the zero-power frequencies and $P_1$ and $P_2$ are the power outputs of the generators. Setting $P_1$ and $P_2$ equal to the sums of their primary and auxiliary load contributions:

$$\omega_1 = \omega_1^* - K(P_{e1} + P_{AUX1}) \tag{3}$$

$$\omega_2 = \omega_2^* - K(P_{e2} + P_{AUX2}) \tag{4}$$

To obtain the desired zero-power offset, we use the constraint that the generator frequencies $\omega_1$, $\omega_2$ are equal when the contributions to the propulsive load $P_{e1}$, $P_{e2}$ are equal:

$$\omega_1^* - K(P_e + P_{AUX1}) = \omega_2^* - K(P_e + P_{AUX2}) \tag{5}$$

$$\omega_2^* - \omega_1^* = K(P_{AUX2} - P_{AUX1}) \tag{6}$$

Thus, for identical generator sets, $\Delta\omega^* = K\Delta P_{Aux}$. It will be understood that where there are more than two generator sets connected in parallel, the above relation should hold for any pair of the generators.

To implement control where the auxiliary loads 51, 52 are variable loads, power feedback of the auxiliary load power demands $P_{Aux1}$, $P_{Aux2}$ can be implemented. For example, the present power demand of the auxiliary loads 51, 52 may be sensed by a sensor arrangement 18 and fed back to the controller 17. In response to a change in the power demand of the auxiliary loads, the controller 17 updates the droop control profiles such that the difference in the zero-power frequencies at all times results in a common generator frequency value w for which the difference between the power outputs of the two generator sets is equal to the difference in the power of the auxiliary loads 51, 52. Meanwhile, any change to power demand of the propulsive load(s) is accommodated for via a change in the generator frequencies in accordance with the present versions of the droop control profiles.

To illustrate, consider again the ship propulsion system with two identical 2048 kVA diesel generator sets. As before, the two auxiliary loads are initially the same but after eight seconds one of the auxiliary loads is increased from 0.1 MW to 1.0 MW. This time, however, responsive to the change in the second auxiliary load, the droop control profiles of the first and/or second generators are modified as described above and illustrated in FIG. 3A. That is, a zero-power offset is introduced such that at a common frequency $\omega_f$ (which may be the same as or different to the initial common frequency $\omega_i$), the difference in power output accommodates the 0.9 MW difference in auxiliary load power.

Having modified the droop control profiles, the system controller 17 controls the first and second generator sets in accordance with the modified droop control profiles. This will typically involve (i) controlling the second diesel engine, using standard prime mover speed governor control, so that it increases its power output; and (ii) if necessary, changing the common generator frequencies from $\omega_i$ to $\omega_f$.

Figure 3B:
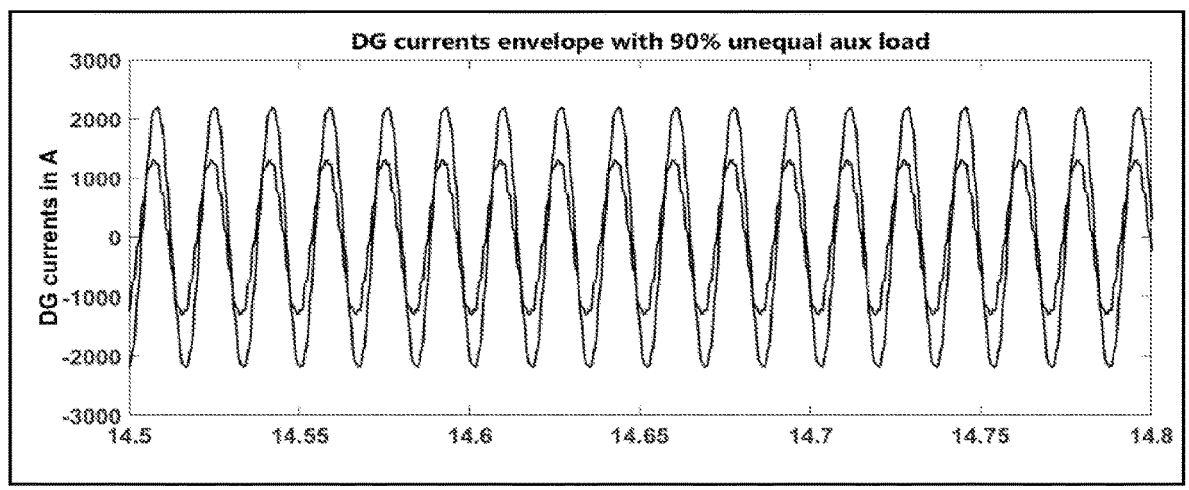
FIG. 3B shows the currents flowing in a pair of parallel-connected generators with unequal auxiliary loads connected to each generator, using a modified form of droop control.

Between zero and eight seconds (i.e. when the two auxiliary loads are equal), the currents flowing through the two generators G1, G2 will be equal as shown in FIG. 2B. However, using the modified droop control described herein, after eight seconds the power outputs and thus currents flowing through the two generators will no longer be equal. This is shown in FIG. 3B. The difference in current (and power) between the two generators accommodates the greater power demand of the second auxiliary load and allows the equal power sharing of the propulsive load. Thus, a reduced fundamental current flows through the transformer, as shown in Table 3:

different droop coefficients would likely result in increased transformer current even with equal load sharing implemented.

In summary, embodiments of the present disclosure allow equal sharing of propulsive loads between multiple parallel-connected generators even where the generators must power their own different, possibly variable, auxiliary loads. This is achieved using a modified form of droop control, in which a zero-load offset between generator sets is introduced in order to accommodate a difference in auxiliary load power when the generators operate at equal frequencies.

FIG. 4

Figure 4:
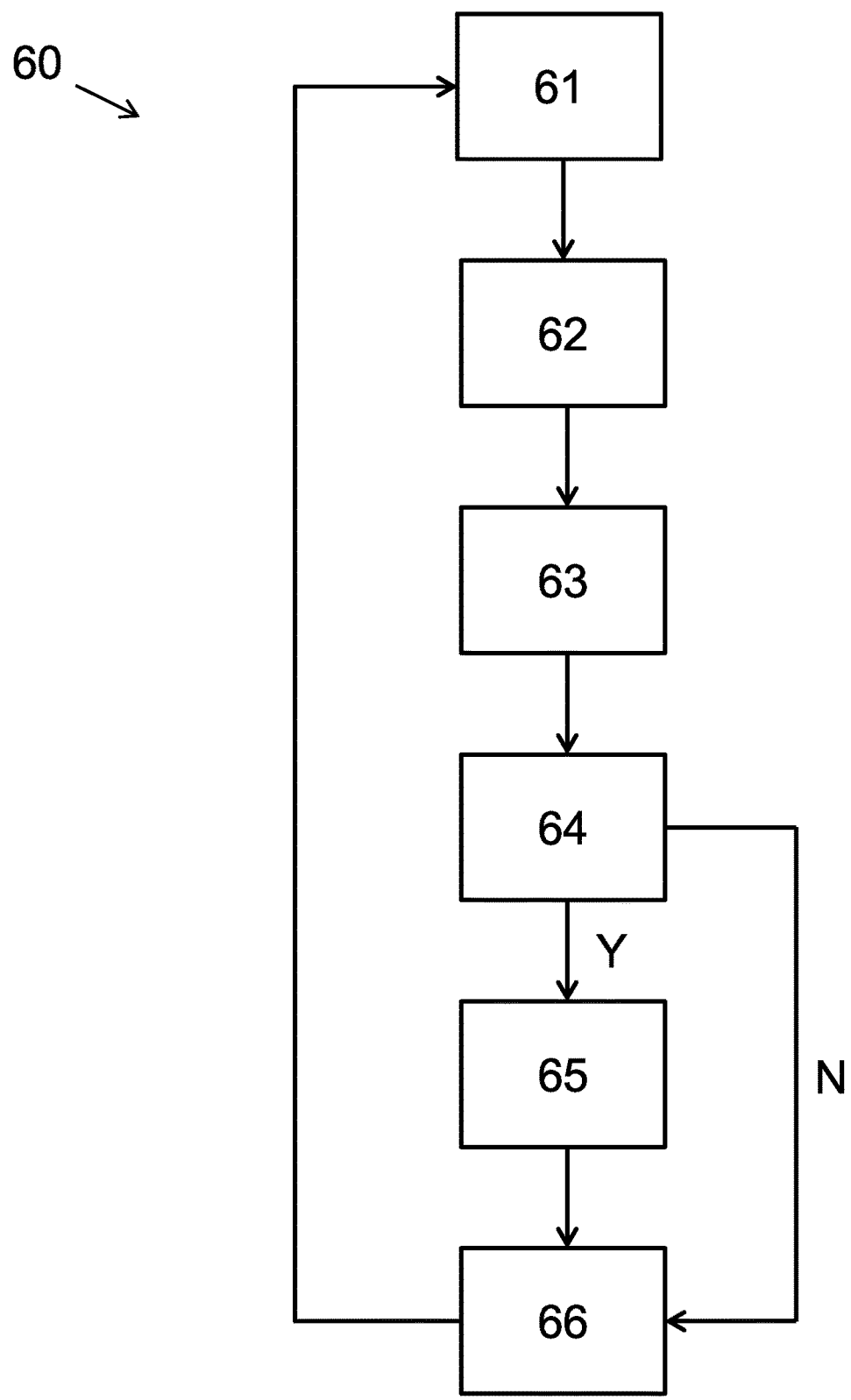
FIG. 4 is a flow chart illustrating a method of controlling an electrical power system.

FIG. 4 is a flow chart illustrating a method 60 of controlling an electrical power system, for example the distributed propulsion system 10 of FIG. 1.

The method 60 begins at 61, where a controller 17 receives an indication of a thrust demand for the propulsion system 10. Based on the thrust demand, the controller determines suitable operating parameters for one or more propulsive loads M1-M4 of the system 10 for meeting the thrust demand. The controller 17 then controls the motors M1-M4 and associated converter arrangements 31-34 to implement the determined operating parameters.

At 62, based on the determined operating parameters of the propulsive loads M1-M4, the controller 17 determines electrical power demands for the propulsive loads.

At 63, the controller 17 receives, from a suitable source, indications of the present power demands of one or more auxiliary loads 51-54 connected to the busses 21-24 of the electrical power system. The source may be a suitable sensor arrangement 18 that monitors the power demands of the auxiliary loads. The controller 17 may receive the sensed data directly from the sensor arrangement 18, or via another controller.

At 64, the controller 17 determines whether any of the auxiliary load electrical power demands have changed compared to previous auxiliary load electrical power demands. If not, the method proceeds to 66. If there has been a change in the auxiliary load power demands, the method proceeds to step 65.

TABLE 3

| | DG-1 Power (MW) | | DG-2 Power (MW) | | Transformer Current rms (A) | |
|---|---|---|---|---|---|---|
| | Before 8 secs | After 8 secs | Before 8 secs | After 8 secs | Before 8 secs | After 8 secs |
| Normal Droop Control | 0.5059 | 0.718 | 0.5058 | 0.718 | 82.99 | 521.9 |
| Modified Droop Control | 0.5058 | 0.5238 | 0.5057 | 0.9119 | 82.76 | 189.4 |

As can be seen from Table 3, when the modified droop control is used, the transformer current increases by a factor of just over two. This compares favourably with the six- to seven-fold increase seen when normal droop control is used.

In principle, the modified droop control described above could be adapted for non-identical generator sets. Non-identical generator sets would have different droop line gradients $K_1$ and $K_2$. As a result, the appropriate difference in the zero-power frequency values $\Delta\omega^*$ would be a function of the two gradients $K_1$, $K_2$ and also the present propulsive load power demand. In practice, however, it would be advantageous to use identical generator sets. This is because the feedback and control process for non-identical generator sets would be more complex, and also because the use of At 65, in response to determining there has been a change in the auxiliary load power demands, the controller 17 updates the droop control profiles for the generator sets. Specifically, as described above with reference to FIGS. 3A-3B, the controller will determine and apply suitable zero-power frequency offsets for the droop control profiles. The droop control profiles will differ such that, for any given pair of parallel-connected generators, a difference between the power outputs of the generators at equal generator frequencies is equal to the difference between the power demands of their auxiliary loads.

At 66, the controller 17 controls the generator sets 11-14; G1-G4 in accordance with the electrical power demands of the propulsive loads M1-M4, as determined at step 62, and the droop control profiles. The control is constrained such that parallel-connected generator sets operate at the same generator output frequency. In this way, parallel-connected generators will meet the power demands of their own auxiliary loads and simultaneously provide equal shares of the total power demand of the propulsive load(s) to which they are connected.

The method then returns to step 61 or 63, where new system thrust demands and/or auxiliary load power demands are received by the controller 17.

Various modifications may be made to the electrical systems and methods described above. For example, the following may apply alone and in combination:

a) Although the invention has been described with reference to a propulsion system 10, the invention could be used in other systems. For example, the propulsive electrical loads M1-M4 and propulsors 41-41 may be replaced with other electrical loads, for example electrical motors powering industrial machinery. Generally speaking, loads may be characterised as either (i) primary loads, which are connected to multiple generator sets and busses to permit load sharing; or (ii) auxiliary loads, which are connected to only one bus.

b) Although FIG. 1 shows each bus 21-24 connected to an auxiliary load 51-54, this need not be the case and some busses may not be connected to any auxiliary load. What matters is that the auxiliary loadings of parallel-connected generator sets are different or variable. This may be because of two different auxiliary loads, two auxiliary loads in which one or both loads are variable, or one bus having an auxiliary load and the other bus having no auxiliary load.

c) Whilst four generator sets 11-14, G1-G4, busses 21-24 and primary loads M1-M4 have been described, this is only by way of an example. There may be any number of ac busses greater than or equal to two. Each ac bus may be supplied by one or more generator sets. There may be any number of primary loads greater than or equal to one, and each primary load is connected in parallel with any number of ac busses greater than or equal to two.

d) Whilst the controller 17 has been described as a single controller, its functions may be implemented by multiple controllers or controller modules. The control functions and modules may be implemented in hardware or software or a mixture of the two.

e) As noted previously, whilst the parallel-connected generator sets are preferably identical, different generator sets could be used.

f) Whilst three-phase permanent magnet synchronous machines have been described, this is only an example and other kinds of electrical machines could be used.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An electrical power system comprising:
a first ac bus and a first generator set configured to supply the first ac bus with ac electrical power;
a second ac bus and a second generator set configured to supply the second ac bus with ac electrical power;
an interconnecting transformer connected between the first and second ac busses;
a primary electrical load connected to both the first and second ac busses via a converter arrangement, such that the primary electrical load can receive electrical power from both the first and second generator sets;
an auxiliary electrical load connected the first ac bus, such that the auxiliary electrical load receives electrical power from the first generator set; and
a controller configured to control the first generator set according to a first droop control profile and to control the second generator set according to a second droop control profile, the first and second droop control profiles relating respective output frequencies of the first and second generator sets to respective output powers of the first and second generator sets,
wherein:
the controller is configured to control the first and second generator sets such that their output frequencies are equal; and
the first and second droop control profiles differ such that, when the first and second generator sets operate at equal output frequencies, an electrical power demand of the primary electrical load is shared equally between the first and second generator sets whilst an electrical power demand of the auxiliary load is met by the first generator set.

2. The electrical power system of claim 1, wherein the primary load comprises one or more electrical machines.

3. The electrical power system of claim 1, wherein the primary load is a propulsive load and the auxiliary load is a non-propulsive load.

4. The electrical power system of claim 1, wherein the first and second droop control profiles have different zero-power frequencies.

5. The electrical power system of claim 1, wherein the auxiliary load has a variable power demand, and wherein the controller is configured to adapt the first and/or second droop control profiles based on the present power demand of the auxiliary electrical load.

6. The electrical power system of claim 1, further comprising a sensor arrangement configured to sense the power demand of the auxiliary electrical load and to provide the sensed power demand to the controller.

7. The electrical power system of claim 1, wherein:
the auxiliary load is a first auxiliary load;
the system further comprises a second auxiliary electrical load connected to the second ac bus, such that the second auxiliary electrical load receives electrical power from the second generator set; and
the first and second droop control profiles differ such that, when the first and second generator sets operate at equal output frequencies, an electrical power demand of the primary electrical load is shared equally between the first and second generator sets whilst an electrical power demand of the first auxiliary load is met by the first generator set and an electrical power demand of the second auxiliary load is met by the second generator set.

8. The electrical power system of claim 7, wherein the electrical power demands of the first and second auxiliary loads are different.

9. The electrical power system of claim 1, wherein the first and second generator sets are identical.

10. The electrical power system of claim 1, wherein the first and second ac busses are phase shifted with respect to each other.

11. The electrical power system of claim 10, wherein the first and second ac busses are phase shifted with respect to each other by about 30 degrees.

12. The electrical power system of claim 1, wherein the first generator set comprises a first prime mover connected to a first electrical machine; and the second generator set comprises a second prime mover connected to a second electrical machine.

13. A vehicle propulsion system comprising the electrical power system of claim 1.

14. A vehicle comprising the electrical power system of claim 1.

15. A method of controlling an electrical power system having first and second ac busses connected by an interconnecting transformer; respective first and second generator sets connected to the respective first and second ac busses; a primary electrical load connected to both the first and second ac busses via a converter arrangement; and an auxiliary electrical load connected to the first ac bus, the method comprising:
controlling the first generator set according to a first droop control profile, the first droop control profile relating an output frequency of the first generator set to an output power of the first generator set; and
controlling the second generator set according to a second droop control profile different from the first droop speed control profile, the second droop control profile relating an output frequency of the second generator set to an output power of the second generator set,
wherein the first and second generator sets are controlled such that their output frequencies are equal; and
wherein the first and second droop control profiles differ such that, when the first and second generator sets operate at equal output frequencies, an electrical power demand of the auxiliary load is met by the first generator set and an electrical power demand of the primary electrical load is shared equally between the first and second generator sets.

16. The method of claim 15, further comprising:
determining an electrical power demand of the primary electrical load; and
controlling the first and second generator sets in accordance with the first and second droop control profiles and the determined electrical power demand of the primary electrical load.

17. The method of claim 15, further comprising:
receiving an indication of the electrical power demand of the auxiliary electrical load;
determining, based on the received indication, that the electrical power demand of the auxiliary electrical load has changed; and
responsive to determining that the electrical power demand of the auxiliary electrical load has changed, modifying the first and/or second droop control profile such that, when the first and second generator sets operate at equal output frequencies, the electrical power demand of the auxiliary load is met by the first generator set and the electrical power demand of the primary electrical load is shared equally between the first and second generator sets.

18. The method of claim 15, wherein the auxiliary load is a first auxiliary load; the electrical system further includes a second auxiliary load connected to the second ac bus; and the first and second droop control profiles differ such that, when the first and second generator sets operate at equal output frequencies, the electrical power demand of the primary electrical load is shared equally between the first and second generator sets whilst an electrical power demand of the first auxiliary load is met by the first generator set and an electrical power demand of the second auxiliary load is met by the second generator set.

19. The method of claim 15, wherein the first and second droop control profiles have different zero-power frequencies.

20. A non-transitory computer readable medium having code stored thereon which, when executed by one or more controllers of an electrical power system, causes the one or more controllers to:
control a first generator set according to a first droop control profile, the first droop control profile relating an output frequency of the first generator set to an output power of the first generator set; and
control a second generator set according to a second droop control profile different from the first droop speed control profile, the second droop control profile relating an output frequency of the second generator set to an output power of the second generator set,
wherein the first and second generator sets are controlled such that their output frequencies are equal; and
wherein the first and second droop control profiles differ such that, when the first and second generator sets operate at equal output frequencies, an electrical power demand of the auxiliary load is met by the first generator set and an electrical power demand of the primary electrical load is shared equally between the first and second generator sets.

* * * * *